April 15, 1930.　　　　J. G. UTZ　　　　1,754,291
MOTOR VEHICLE CONSTRUCTION
Filed Nov. 27, 1925　　　2 Sheets-Sheet 1
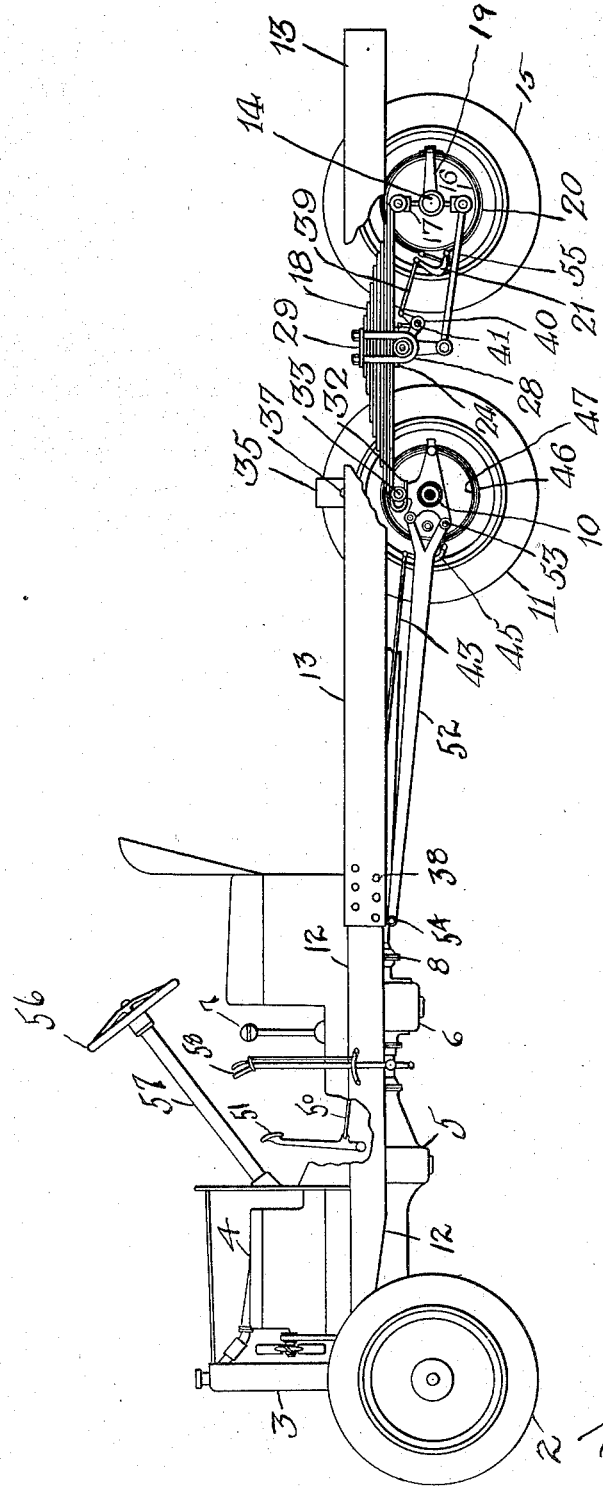
Inventor
John G. Utz

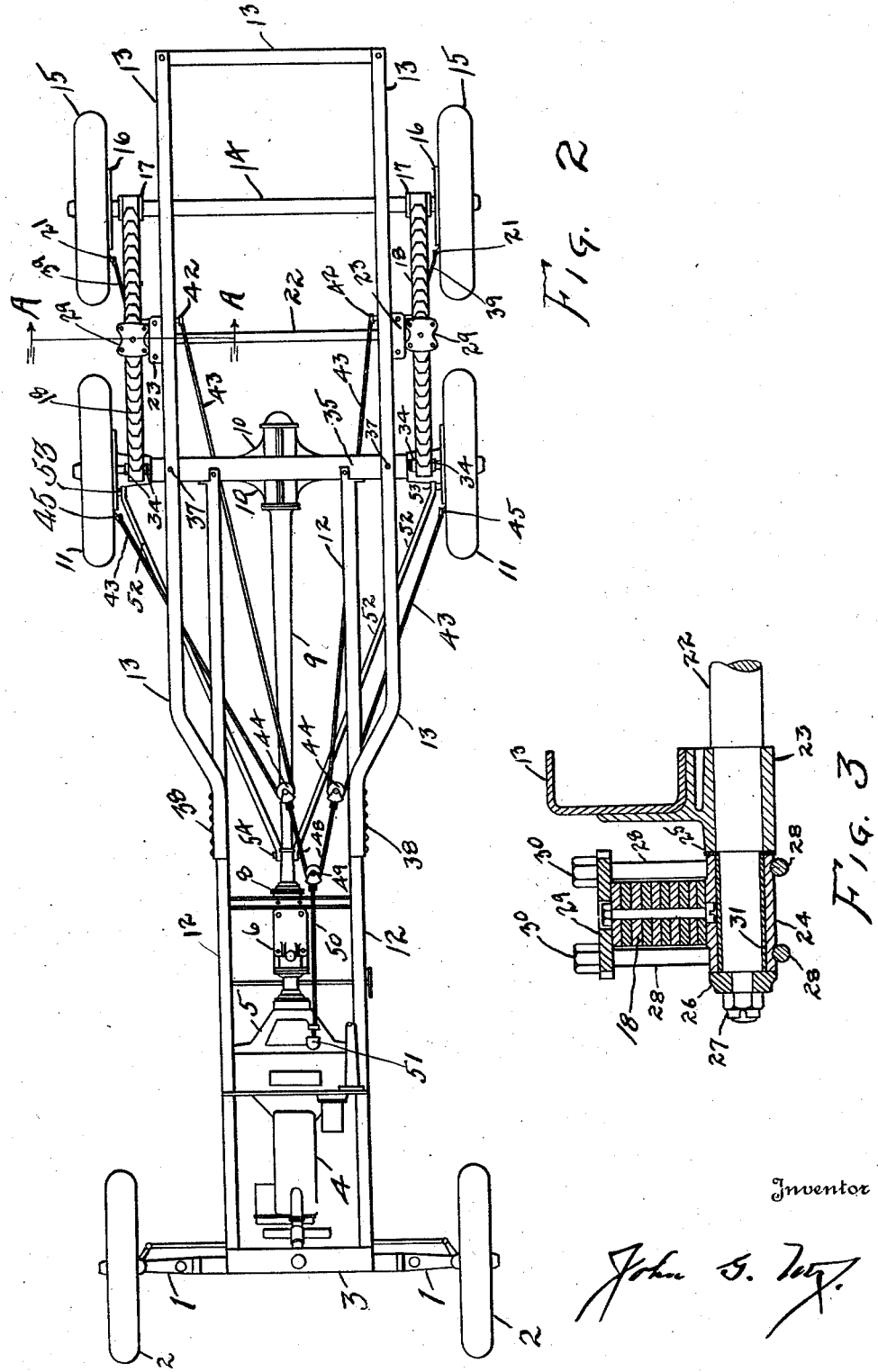

Patented Apr. 15, 1930

1,754,291

UNITED STATES PATENT OFFICE

JOHN G. UTZ, OF DETROIT, MICHIGAN, ASSIGNOR TO OTILLA H. UTZ, OF DETROIT, MICHIGAN

MOTOR VEHICLE CONSTRUCTION

Application filed November 27, 1925. Serial No. 71,573.

The invention relates to motor vehicle construction, and more particularly to method of attaching an additional axle to a Ford truck, thereby transforming the Fort truck into a six-wheel vehicle of larger carrying capacity and better riding quality.

The standard Ford truck, by virtue of its original construction, is limited in its carrying capacity as well as wheel base and body space. To extend the wheel base, and offer more body space, and thus greater carrying capacity, many constructions have been devised, such as that shown in my application Serial Number 56,613 of September 16, 1925. These constructions serve quite well up to a point where the increased load carried approaches the safe limit of the Ford rear axle. Likewise, when it is desired to carry greater load, more pulling ability must be provided, since the power of the Ford engine is limited, and also additional braking ability must be provided to make for safety. It is likewise desirable to provide a spring suspension able to accommodate the heavier loads imposed and that will provide what are known as good riding qualities.

To meet all of these requirements in a simple and inexpensive manner, I have devised a means of attaching an additional axle and supplementary frame, providing inverted semi-elliptic leaf springs between the two rear axles, which springs in turn support the supplementary frame at a point near their center. The original Ford springs are discarded, and the supplementary frame is bolted to the original Ford frame in such a manner that the two frames become a unit. This application of leaf springs divides the carried load approximately equally between the original Ford rear axle and the added rear axle. This added rear axle is what is known as a "dead" axle, because it does not rotate, nor does it transmit power to its wheels. The wheels of this added axle are provided with antifriction bearings within their hubs, which run on the dead axle, and each wheel is provided with a brake drum, brake bands, and brake operating mechanism of a conventional type.

Since the distance of the Ford rear axle from the Ford front or steering axle, is determined by the original Ford construction, the inverted leaf spring is so attached to the Ford rear axle that there is lateral but not longitudinal restraint. The point where this spring applies its pressure to the Ford rear axle is the same as in the original construction, which means that no new stresses are added to the Ford rear axle. It will thus be seen that the modified Ford truck can carry approximately double its original capacity without increasing the loading on the Ford rear axle beyond that load for which it was intended. The dead axle is located relative to the Ford rear axle by the springs and any convenient form of linkage, which springs and linkage serve to carry the brake mechanism and react the torque of the brakes when applied. Means are provided for equalizing the braking efforts on the four rear wheels, thus providing double braking ability to that of the original construction.

When the load carrying ability of the vehicle is so greatly increased, it often becomes necessary to introduce a secondary or auxiliary transmission, whereby lower gear ratios are available to obtain more tractive effort from the standard Ford engine at the sacrifice of road speed.

I am aware of the fact that six wheel constructions are common on motor vehicles where both the rear axles are provided with power transmitting means, but such constructions are expensive and must necessarily be part of the original construction of the vehicle, whereas, in my invention a non-driving axle is added to a vehicle originally constructed as a four wheel vehicle.

While my invention primarily relates to the transformation of a four wheel Ford truck into a six wheel vehicle, the same elements can be applied to an original construction of a motor vehicle wherein two rear axles, one dead and one transmitting power, are employed.

With the above and other objects in view, my invention consists in the arrangement, combination and construction of the various parts of my improved device as described in the specification, claimed in my claims, and shown in the accompanying drawings.

Fig. 1 is a side elevation of a vehicle chassis with the frame cut away to disclose the rear spring connections to the two rear axles.

Fig. 2 is a plan view of the vehicle chassis.

Fig. 3 is a section taken on line A—A of Fig. 2.

In the drawings, 1 designates the front axle of a Ford truck with its wheels 2. 3 is a radiator, 4 is an engine, 5 is a housing enclosing a fly wheel, clutch and speed changing mechanism, 6 is an auxiliary speed changing mechanism, 7 is the lever controlling the auxiliary speed changing mechanism. 8 is a universal connection between 6 and the propeller shaft housing 9. 10 is the standard Ford rear axle housing to which the propeller shaft housing 9 is bolted.

11 are the wheels on the standard Ford rear axle, 12 is the Ford frame, 13 is an auxiliary or supplementary frame, 14 is an added "dead" axle, with wheels 15, which in turn carry the brake drums 16. To the dead axle 14 are attached swivel brackets 17 to which are connected the rear ends of the springs 18, the brake anchors 19, brake bands 20 and brake operators 21. 22 is a fixed trunnion shaft which extends across the vehicle and is attached right and left to the supplementary frame 13, by brackets 23. On the ends of trunnion shaft 22 are rotatable spring seats 24 which are located laterally by shoulder 25 and collar 26. Collar 26 is held in place by nut 27. The springs 18 are firmly attached to the seats 24 by the U-bolts 28, the plates 29 and the nuts 30. Seats 24 are provided with replaceable bushings 31 and are free to rotate on the trunnion shaft 22 which in turn is fixed to prevent rotation in brackets 23. The rear end of the spring 18 is attached to the brackets 17 through a conventional spring eye. The front end of the spring 18 is provided with a hook 32 which rests on the pin 33 extending from the axle housing, and the spring 18 is located laterally by collars 34, though free to move longitudinally. The supplementary frame 13 is bolted fast to the ends of the Ford frame rear cross member 35 at 37, and also to the Ford frame side rails at 38, the supplementary frame channel being deep enough to envelop the Ford frame rails.

The brake bands 20 are operated through links 39 by levers 40, shafts 41, levers 42 and cables 43. Cable 43 passes around the pulley 44 and back to the operating lever 45 on the brake band 46 on the standard Ford brake drum 47. To the pulleys 44 is attached the cable 48 which passes around the pulley 49 and thus equalizes the pull on the right hand brakes with the pull on the left hand brakes, as well as equalizing the brakes on the dead axle with the brakes on the driving axle. To the pulley 49 is attached the rod 50 which passes forward and attaches to the foot brake pedal 51 in such a manner that when the pedal is pushed forward by the driver, equal pressures are applied to all four rear wheel brakes. Any other method for equalizing brake pressures may be used.

The radius rods 52 are attached to the Ford rear axle at 53 and to the propeller shaft housing 9 at 54. The combination of the propeller shaft housing 9 and the radius rods 52, determines the position of the Ford rear axle, confining its path of motion to that of an arc of a circle whose center is the universal connection 8. It will be seen, therefore, that when the Ford axle moves up and down in passing over rough roads, the point of contact between the pin 33 and the spring hook 32 will vary in a longitudinal direction, which variation will also be affected by the elongation or shortening of the spring 18 due to its deflection. When passing over rough roads the path of motion of axle 14 relative to frame 13 will be determined by the link 55 and spring 18. The location of the shaft 41 and link 39 is such that the operation of the brake band 20 through lever 21 will not be affected by relative motion between axle 14 and frame 13. The position of pulley 49 and pulley 44 is such that operation of brake band 46 through lever 45 will not be affected by relative motion between axle housing 10 and frames 12 and 13. 56 is a conventional steering wheel attached to column 57. 58 is a hand brake lever which is connected to operate an internal brake within the drum 47 (not shown). If desired, brake lever 58 can be so interconnected with pedal 51 that the external brakes on the four rear wheels can be operated either by hand lever 58 or foot pedal 51.

It will be noted from the foregoing specification that the addition of the dead load carrying axle 14 and its wheels 15 interconnected with axle 10 through the springs 18 to the supplementary frame 13 and thence to the main frame 12 and main frame cross member 35, in no way affects or modifies the functioning of the axle 10 when transmitting power from the engine 4 through the transmission 5 and 6, flexible connection 8 and propeller shaft within the housing 9, but that the axle 14 does share the carried load imposed on frame 13, approximately equally with the axle 10, and because of the brake bands 20 on the wheels of the dead axle 14 being interconnected with the brake bands 46 on the wheels 11, approximately double braking effect is available. Because of the trunnion effect of the spring seat 24 on the trunnion shaft 22, shocks imposed on a left or right wheel 11, will be partly transferred to the left or right wheel 15 through spring 18. This condition makes for better riding qualities.

It may not always be necessary to employ the auxiliary transmission 6. If it is omitted the flexible connection 8 would be moved forward to attach to the rear of the transmission 5 without affecting the functioning of the other units of this combination, and when transmission 6 is omitted the distance between the axles 1 and 10 can be reduced by an amount equal to the length of the transmission 6, and the attachment point 38 would likewise be moved forward on the frame 12, and the attachment of frame 13 to cross member 35 at 37 would assume a new position without changing the distance between axles 10 and 14 and the length of the springs 18. When this construction is applied to a standard Ford truck, it will be noted that the application is quite simple and does not materially modify the original construction of the Ford truck chassis.

It will be apparent now that I have devised a novel and useful construction in a very simple combination. Obviously changes in detail may be made without departing from the spirit of the invention and I do not care to limit myself to any particular form or arrangement of these elements.

What I claim is:

1. In a motor vehicle, in combination, a frame, a pair of closely associated non-steering rear axles, one of said axles being a driving axle and being provided with a housing and the other of said axles being a dead axle, said housing being pivotally connected to said frame by means of a propeller shaft housing, a pair of springs extending longitudinally of said frame between said axles and trunnioned to said frame therebetween, a sliding connection between the front ends of said springs and said housing, and a pivotal connection between the rear ends of said springs and said dead axle, said dead axle being maintained against movement longitudinally of said springs whereby to maintain the wheels on said rear axles in constant approximate alignment.

2. In combination with a motor vehicle, a frame, a steering front axle and a pair of relatively closely associated non-steering rear axles, the forward of said rear axles being a driving axle and the rearward of said rear axles being a dead axle, means for maintaining said forward rear axle at a predetermined distance from a point fixed relative to said frame and permitting vertical movement thereof relative to said frame, and springs trunnioned to said frame between said rear axles, said springs having a connection with said forward rear axle whereby to permit movement thereof longitudinally of said springs, and said springs having a connection with said rearward rear axle maintaining said rearward rear axle against movement thereof longitudinally of said springs and controlling the aligned relationship of the wheels carried thereby relative to the wheels carried by the forward of said rear axles.

3. In a motor vehicle, in combination, a frame, a housed driving axle, a non-steering dead axle, radius rods and propeller shaft housing connecting the driving axle to the frame, a single spring on each side of said frame, said spring being connected at one end to said driving axle and at the other end to said dead axle and being trunnioned between their ends on said frame, means cooperating with said springs and dead axle for maintaining said dead axle against movement longitudinally of said springs, and means connecting said springs with the housing of said live axle permitting movement thereof longitudinally of said springs comprising transversely disposed pins carried by said driving axle and reversely bent ends on said springs slidably embracing said pins.

JOHN G. UTZ.